March 3, 1964  D. BELLAMY, JR  3,123,072
FLEXIBLE TUBE COUPLING AND CLOSING APPARATUS
Filed March 9, 1959  3 Sheets-Sheet 1

INVENTOR.
DAVID BELLAMY, Jr.
BY
Emery, Booth, Townsend, Miller + Weidner

ATTORNEYS

March 3, 1964 D. BELLAMY, JR 3,123,072
FLEXIBLE TUBE COUPLING AND CLOSING APPARATUS
Filed March 9, 1959 3 Sheets-Sheet 3

*INVENTOR.*
DAVID BELLAMY, JR.
BY Emery, Booth, Townsend, Miller, + Weidner
ATTORNEYS United States Patent Office 3,123,072
Patented Mar. 3, 1964

3,123,072
FLEXIBLE TUBE COUPLING AND
CLOSING APPARATUS
David Bellamy, Jr., Ashland, Mass., assignor, by mesne assignments, to Baxter Laboratories Inc., Morton Grove, Ill., a corporation of Delaware
Filed Mar. 9, 1959, Ser. No. 798,206
6 Claims. (Cl. 128—221)

This invention relates to apparatus for coupling and closing flexible tubes, and in particular the port tubes of medical and surgical fluid handling equipment, as for example the blood collecting, storing and administering system of Walter Patent No. 2,702,034. The invention provides novelly for coupling the end of a flexible tube directly and integrally to a rigid tube, and for shaping the flexible tube for laminar flow at its junction with the rigid tube end. The invention affords also a hypodermic needle improved by a closure which is tamper-proof, and which is sealed to avoid possible contamination of the needle tip during removal of the cover from the cannula of the needle. The invention needle is distinguished more particularly by an interference fit of the cover within an associated needle part whereby a sterile field is provided around the cover open end. The nature and characteristic features of the invention will be better understood from the following description taken in conjunction with the accompanying drawings in which:

Figure 1:
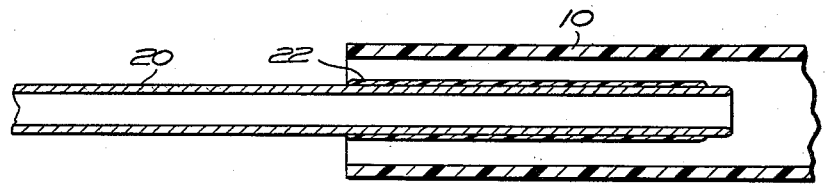
FIG. 1 is a sectional view of a rigid tube and a normally larger flexible tube such as are directly coupled under the invention.

In FIG. 1 I show at 10 the end of a flexible tube which may be any inlet or outlet tube of the flexible resilient type of fluid handling equipment here concerned. The tube 10 may under the invention be any flexible resilient tube of elastomeric composition, such as a tube formed from plastic and also rubber and rubberous material. In the apparatus of the mentioned Walter patent, and as herein illustrated, the port tube is formed from a plastic material, for example polyvinyl chloride, such as is sealable, sterilizable, and nonwettable to blood.

The flexible elastic tube 10 is here adapted for fluid collecting or administering use by its coupling directly and integrally to a rigid tube or cannula 20, FIG. 1. The tube 20 may be of rigid plastic construction or it may be of metal, such as stainless steel, in which latter case it may for the blood handling use be coated with an anticoagulant. The cannula shown in the drawings is a metal one as usual to hypodermic needles for piercing puncturable closures and for making subcutaneous injections, and for such purpose ground at one end to present a bevel or point 21, FIG. 2.

This invention is in part directed to the sealed interfitting and integral coupling of unmatched tubular parts. That is, the piercing and injecting cannula 20 is smaller outside than the flowing tube 10 is inside. The drawings indicate a usual cannula-tube size relation, such as exemplified by a 3 mm. flexible tube having a normal or full-open inside diameter of about 0.118 in. coupled to a 15 gauge cannula having an outside diameter of about 0.072 in.

For the desired firm sealing coupling of the flexible tube directly to the rigid cannula there may first be applied to the outer cannula wall a cement film or coating 22, FIG. 1. Where either the tube or the cannula is plastic, the cement may comprise a mixture of plastic of the same or similar type dissolved in an evaporating solvent. The plastic cement 22 is coated on that length of the rigid tube end required for secure fastening to the flexible tube end, and it flows into the surface irregularities or grooves of a metal or steel tube so as to mechanically interlock with as well as chemically adhere to the same.

The cement coating 22 may be omitted where both the flexible tube end and the rigid tube end are of plastic or other composition sufficiently compatible to promote adhesion.

The end of the flexible tube 10 is next reduced, shrunk or compressed into tight sealing engagement with the end of cannula 20 and more particularly with the cannula length coated with the plastic cement 22. This can be done with a plastic tube by forcing the tube end into a hot forming mold arranged to reduce it so as to have an inside diameter smaller than the outside diameter of the cannula end, and by heating the mold sufficiently to cause the plastic memory to be given up. The plastic tube end as thus reduced is then removed from the mold and expanded and advanced over the cannula end into the mentioned coating-engaged position.

Figure 2:
FIG. 2 shows a flexible tube end reduced and bonded to a cannula.

To complete the integral coupling or joining of the flexible tube directly to the rigid cannula the interfitted ends are then heated to a degree sufficient to fuse or bond the tube 10 to the coating 22. This produces a joint of adequate strength, and the resultant cannula-fitted tube end, FIG. 2, is itself operable for fluid flowing connection, to effect which the flexible tube end or the cannula itself may be grasped and manipulated in the generally similar fashion as the needle hubs to be described.

Figure 3:
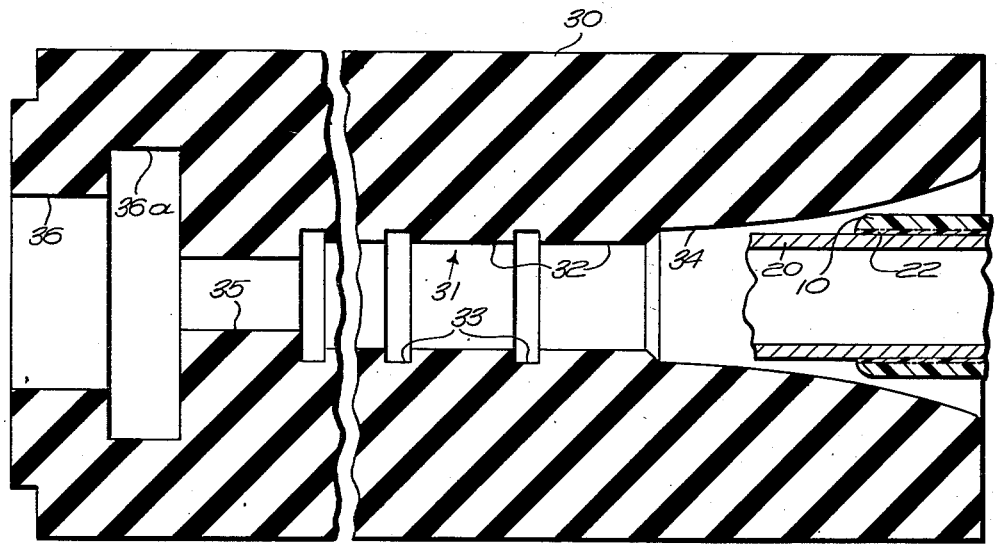
FIG. 3 is a sectional view of the elastic hub of the invention needle.
Figure 4:
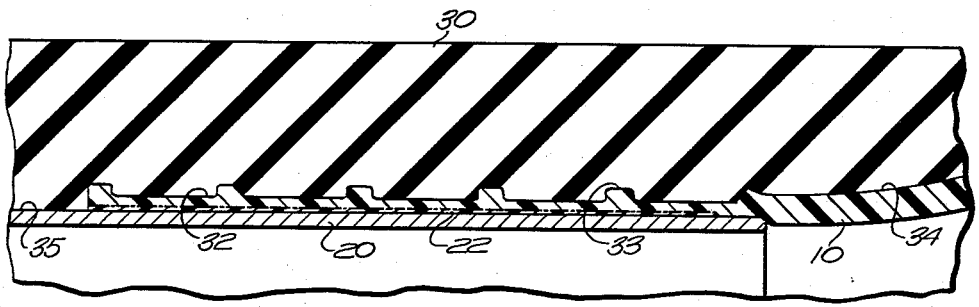
FIG. 4 is a half section showing the hub expanded over and contracting a tube end about the needle cannula.

In the invention needle the flexible tube end is reduced and contracted about the coated cannula end by a manipulating element or hub comprising a rubber or the like elastic sleeve 30, FIG. 4. The elastic hub 30 has a tube engaging part 31, FIG. 3, with an inside diameter normally smaller than the outside diameter of the flexible tube 10, when that tube is reduced to engage the cannula 20. When the cannula of the cannula-and-reduced-tube assembly shown at the right, FIG. 3, has the mentioned 15 gauge outside diameter of 0.072 in., and the flexible tube has a wall of 0.5 mm. or about 0.02 in., the inside diameter of the sleeve part 31 may be, say, 0.070 in. The needle hub is thus required in assembly with the cannula and tube end to be appreciably expanded, and so as by its elastic memory to contract tube 10 into the desired tight sealing engagement about cannula 20.

The hub-tube-cannula connection may be strengthened by roughing or serrating either or both of the hub and cannula. In the preferred embodiment of FIGS. 3 and 4 the tube engaging hub bore part 31 is formed with ribs 32 and recesses 33, and compresses the tube end at the ribs 32 so that it flows into and substantially fills the recesses 33, whereby the tube end and hub are mechanically interlocked.

Figure 5:
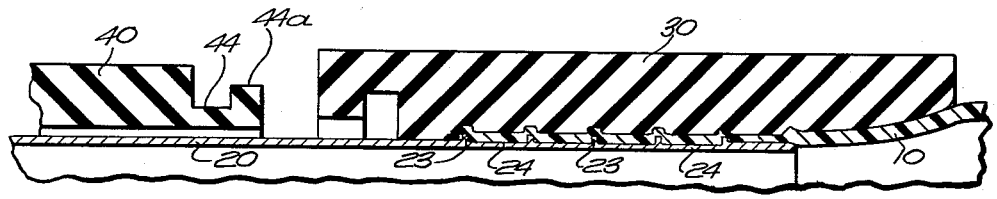
FIG. 5 is a like view of an alternative construction in which the cannula is modified.

In the modified form of FIG. 5 the cannula is provided with ribs 23 and grooves 24 interfitting with the hub recesses 33 and ribs 32 whereby the tube end and hub and also the cannula end are mechanically interlocked as shown.

The relative lengths and lengthwise relation of the assembled parts will be seen to be such that the end of tube 10 overlies cannula coating 22 and is received in the inner or leftmost recess or hub bore part 31, while the outer or rightmost hub rib 32 thereof grips the tube end about at the end of cannula 20.

Beyond the rightmost rib 32 the hub bore is formed with a tapering enlargement or flare 34, FIG. 3.

In accordance with the invention the interfitted rigid and flexible tube ends are so formed that the lumen of the flexible tube there extends substantially flush or continuous with the bore of the rigid tube, thereby eliminating any eddy current cavity such as produced by the mere telescoping or overlapping particularly of a squared-end member. In the preferred needle construction this is accomplished by rounding or chamfering the cannula end both inside and out, and by making the normal inside or smallest diameter of the flare 34 such that when expanded as in FIG. 4 it constricts the tube 10 over the end of the cannula 20 to reduce the tube inner diameter to about midway of the cannula wall, or so as to be substantially continuous with the mentioned inside chamfer.

Equivalent ways of doing this include giving the cannula end a full chamfer or bevel from the inside out or from the outside in, and constricting the flexible tube end there so as to have its inner wall extend substantially flush with the inner wall of the cannula at its extreme end as thus formed.

The flexible tube end coupling of the invention is further characterized in that the flexible tube is itself shaped from or adjacent the cannula end, and either as in FIG. 2 or by the hub flare, for gradual smooth enlargement to its normal or full-open diameter, thereby additionally promoting laminar flow such as non-deteriorating to blood. More particularly the tube end has a flaring portion which merges with the smaller and larger cylindrical portions through blending radii, and intermediate which it may be straight as in FIG. 2 or continously curving as in FIG. 4.

The end or flared bore portion 34 of the hub which projects as described beyond the cannula end may also be employed as the resealing site through which fluids or medication may be introduced, as by a hypodermic needle, into the tube 10, as when in administering use. For such purpose the flexible tube 10 may be coated outside, and at least over that length seated in the mentioned bore portion 34, with a cement adhering it to hub 30 and so preventing its being forced inwardly therefrom by the point of the needle.

Referring still to the elastic hub 30, the same is seen to be formed to the left of the innermost recess 33 with a smallest diameter rib 35 whose inside diameter is predeterminedly smaller than the outside diameter of cannula 20 as shown, FIG. 3. The rib 35 which may for the cited cannula outside diameter of 0.072 in. have a normal inside diameter of 0.040–0.050 in. thus gives the hub 30 an interference fit with the cannula 20 and whereby it grips directly and securely to the same.

The invention as thus far described will be understood to provide a flexible tube coupling apparatus in which a flexible tube is integrally joined to a smaller diameter rigid tube, which rigid tube may be a pointed end cannula, whereby the assembly is constituted as a hypodermic needle. This invention comprehends also the sealed enclosure of the rigid tube or cannula whereby the same, and as well the entire fluid system of which the cannula is hereby made an integral part, may be preserved sterile and air-free in storage prior to use.

In accordance with the invention there is avoided the construction in which a needle cover engages a needle hub in a female-to-male relation, and in which contaminants may infect the open cover end and be wiped onto the needle point in the course of removing the needle cover. There is herein provided rather a male-female cover-hub coupling in which the parts are given also an interference fit whereby to define a sterile field around that portion of the open end of the needle cover which may contact the needle cannula upon its removal therefrom.

In the FIGS. 3–7 apparatus the needle cover comprises a rubber or the like elastic sheath 40 which may be blunt pointed at its closed end 41. The sheath has a bore of a length to enclose the cannula portion projecting from and also to engage in hub 30, and that bore is formed with an inner part 42 shaped and proportioned for an interference or sealing fit with the point 21 and also the adjacent portion of the cannula 20, and with an outer part 43 enlarged for telescoping or sliding freely over the cannula portion intermediate said point-adjacent portion and hub 30.

Figure 6:
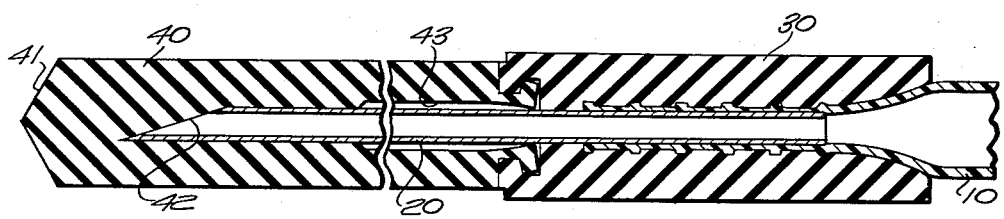
FIG. 6 shows the complete needle assembly including the sheath.

The above mentioned male-female interference coupling of the sheath 40 to the needle hub 30 is herein provided by a sheath open end reduction or stem 44 with outer end enlargement or rib 44a, FIG. 5, which has an interference fit with a sleeve bore enlargement 36 with inner end enlargement or recess 36a, FIG. 6. The sheath and hub are thus joined by radial interfitting locking lip or rib and recess formations 44a, 36a, the inner or male of which is on the sheath 40, whereby the rib 44a or more generally that portion of the open end of the sheath which may in its removal contact the cannula 20 and particularly the point 21, is sealingly enclosed by the hub 30. The provision of a sterile field around the open sheath end is additionally assured by the sizing of the hub enlargement 36 for a tight or wedging fit in the sheath reduction 44 as shown, FIG. 6.

While various forms of interference or sealing fit of a male sheath end to a female hub end may serve to provide the desired sterile zone about the open sheath end, that herein described will be understood to qualify the needle also as tamper-proof. That is, while the form and flexibility of the parts is such that they may be separated or opened from the FIG. 6 position by a merely lateral pulling or opening force, they cannot by a similar but opposite manual manipulation, i.e. by applying a merely lateral pushing or closing force, be restored to the tube closing, cannula-and-sheath-end sealing position. Thus once the sheath has been pulled away from the hub it must remain that way, as a telltale or visual indication that the sterility-seal has been broken.

In one mode of needle assembly the hub 30 is first expanded over and assembled with the tube 10. The sheath 40 and cannula 20 are then assembled as in FIG. 7 and the sheath and hub are interfitted as in FIG. 6, with the aid of the needed tool by which the hub enlargement 36 is expanded as necessary to the closing engagement or insertion of sheath enlargement 44a.

The invention needle affords also sight and/or touch indication of the orientation of the cannula point 21. To this end the assembly procedure may be always to position or orient the cannula 20 with its bevel 21 facing or aligned with sightable and/or feelable hub indicia, as at 37, FIG. 7. The indicia may be, or it may comprise marking which is conveniently and integrally applied to, a flat or other distinguishable hub surface configuration or face, preferably such as may facilitate also the manipulation of the needle. Where the cannula is assembled first with the sheath, the orientation of the point may be externally shown by suitable sheath indicia, such as the guide line or rib which is positioned to face bevel 21 on its sealing by sheath bore part 42, and 45, which, in the following interfitting of the sheath and hub, is aligned with the hub indicia 37. With the herein described needle, then, the doctor may determine the orientation of the cannula point 21 by merely noticing or feeling the hub indicia 37, and without the necessity of removing the needle from the patient.

Following its assembly in the described or other manner the invention needle is heated to soften tube 10 whereby it is assured that under the compression of hub 30 the tube end contacts and conforms to cannula 20 as well as to hub bore part 31. The heating action is also to fuse the plastic tube end to cannula coating 22, FIG. 4, which is accomplishd without heating to a degree to cause hub 30 to lose its elastic memory. Thus in both the flexible tube coupling of FIGS. 1 and 2 and the needle assembly of FIGS. 3–7 the plastic tube is merged with the plastic coating which is chemically adhering to and may also be mechanically interlocked with the metal tube, thereby to provide an integral sealing connection of adequate strength. And in the invention needle that plastic-to-metal tube connection is further sealed and strengthened by the gripping action of the manipulating hub which is seized also directly to the cannula.

Figure 8:
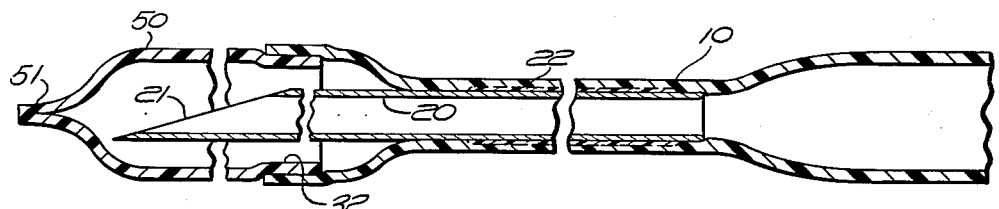
FIG. 8 is a sectional view of an alternative construction in which the flexible tube end and the sheath are modified.
Figure 9:
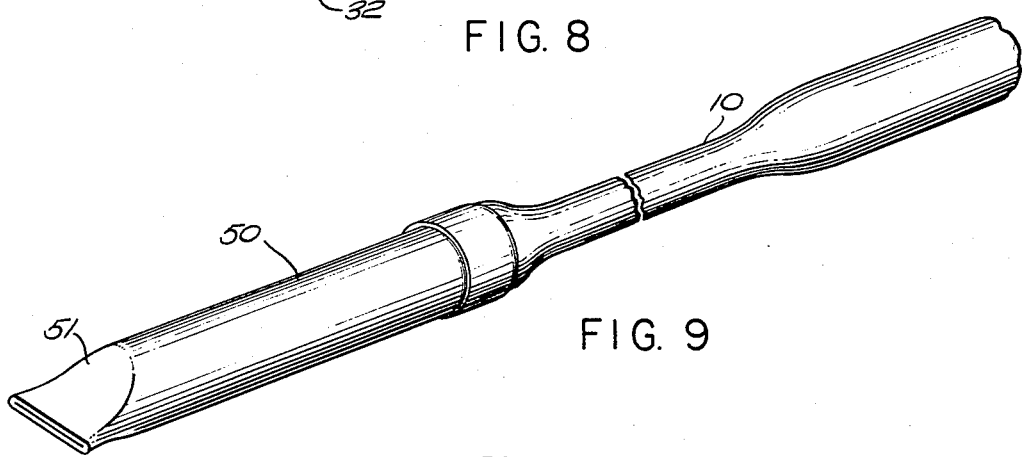
FIG. 9 is a perspective view of the apparatus of FIG. 8.

In FIGS. 8 and 9 is shown a construction in which the apparatus is sealed by seizing or interference fitting the sheath directly to the tube end. Where this form is embodied in a plastic tube 10 and metal cannula 20 as shown the same are again coupled by first applying a plastic cement 22 to a sufficient length of the cannula end distal to the point 21, then inserting that cannula end in the tube end, next reducing the tube end to engage the cannula along and preferably beyond the cement coating 22, and finally heating the plastic tube to bond it to the plastic cement.

But in the reducing of the tube end a suitable length of at the very end of the flexible tube is left unreduced, as shown, or it may be given any reduction less than that for sealing contact with cannula 20.

Where it is not required to seal or contain liquid wholly within the port tube and cannula, the sheath may as here comprise a short length of tubing 50 flatted and sealed at one end 51. The other sheath or tubing end is advanced over the cannula and inserted in the non-contacting tube end. The desired firm sealed interfitting of the sheath end in the tube end may be had by employing for the sheath flexible tubing having an outside diameter greater than the inside diameter which the flexible tube 10 has at its very end, resulting in an interference fit involving the contraction of the sheath end and the expansion of the tube end as shown.

In this sheath-tube engaged embodiment of FIGS. 8 and 9 the tube 10 and sheath 50 will be understood suitably to have an elastic or self-restoring property such that their opposed walls are pressed together with a force sufficient to insure a sterile seal at, and to prevent the casual or inadvertent pulling apart of, the described sheath-end-enclosing coupling.

Figure 10:
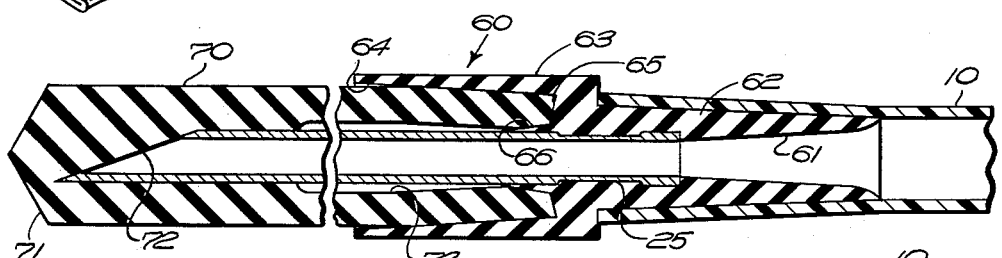
FIG. 10 is a sectional view of an alternative construction in which the needle hub is modified.
Figure 11:
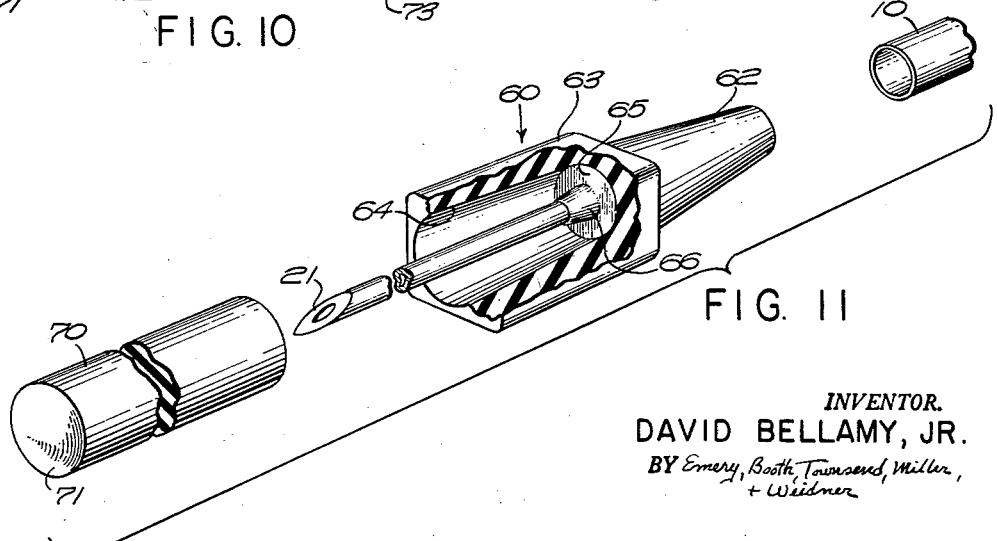
FIG. 11 is a perspective view of the apparatus of FIG. 10.

The flexible tube coupling and closing assembly of FIGS. 10 and 11 has a cannula 20 about which is integrally molded a nylon or the like rigid plastic hub 60. The cannula and hub may be mechanically interlocked, as by the cannula wall recess 25. The hub 60 has a portion which extends beyond the cannula end and is formed with a bore 61 commencing continuously with the cannula bore, flaring gently and smoothly toward its end, and terminating there in a full inside chamfer.

The hub is exteriorly formed in this extending portion with a conical gripping face or surface 62 tapering to merge with the bore 61 at a knife or feather edge as shown. The size and extent of surface 62 is such that the flexible tube 10 is expanded over and securely gripped or seized to the same. The gripping surface is seen also to merge with bore 61 at a terminal formation or edge having a diameter approximating the normal inside diameter of the tube 10, whereby said flexible tube projects therebeyond in the indicated straight smooth or laminar-flow-promoting manner.

The needle hub 60 is formed at its opposite end with an outer sleeve exteriorly formed as at 63 for manual manipulation of the hub, and presenting an annular inner wall 64 tapering inwardly toward a radial inner end or back wall 65. Projecting similarly and centrally from said back wall is a shorter inner sleeve, the latter defining more particularly an annular wedge or spike presenting an outer wall 66 tapering outwardly as the outer sleeve inner wall 64 tapers inwardly toward the recess back wall 65.

Figure 7:
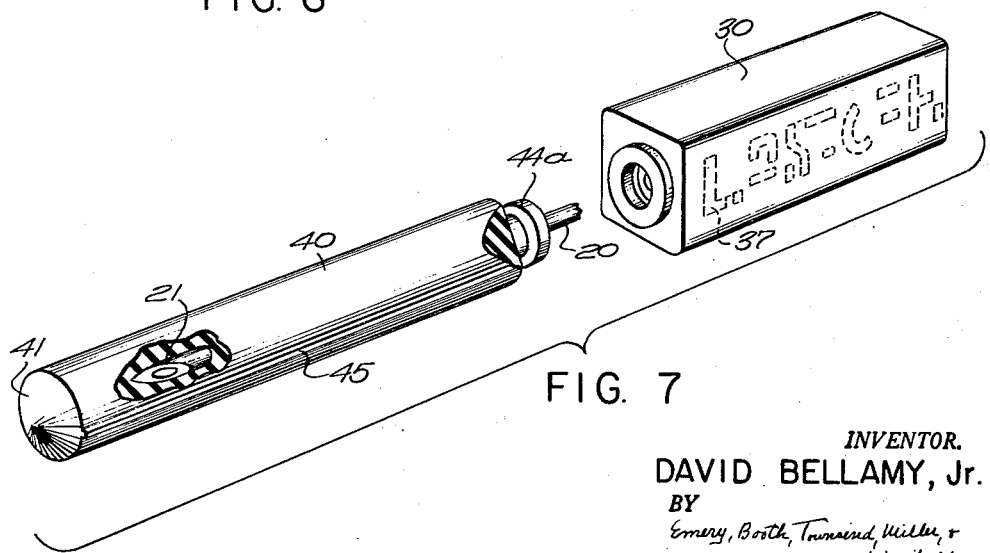
FIG. 7 is a perspective view of the sheath and the needle hub.

The tapering outer sleeve inside wall 64 and inner spike outside wall 66 form a hub recess adapted to receive and sealingly enclose the open end of a sheath 70 which resembles the sheath of FIGS. 6 and 7 in respect to its blunt pointed end 71 and cannula point sealing recess inner part 72, and varies therefrom only in that its open end is not specially formed but merely has a smooth bore defined by the recess outer part 73. In enclosing and sealing the sheath open end the recess walls 64, 66 converge to a spacing at back wall 65 less than the thickness of the wall of the sheath, whereby to wedgingly engage or compress the inserted sheath end as shown.

The hub recess also has an interference fit with the sheath back from its open end, in that the recess outer wall 64 is sized over an appreciable length, which length may as here extend outwardly of the inner spike, to compress or contract the sheath outer wall, see FIG. 10. Thus in this as in the previously described constructions there is afforded a male-female interference coupling of the sheath to the needle hub providing and preserving a sterile field around the open sheath end.

It will be understood that the invention apparatus is adapted in its every described form to be sterilized in medically accepted manner. The flexible tube coupling apparatus hereof has been shown further to provide a firm sealed coupling of a rigid cannula to a flexible tube end, and the sheathed-needle forms to provide a flexible tube closure preventing both entry of contaminants into and escape of fluids out of the flexible tube and the fluid handling system ported thereby.

My invention is not limited to the particular embodiments thereof illustrated and described herein, and I set forth its scope in my following claims.

I claim:

1. A needle assembly comprising a cannula having a pointed end, a thin flexible elastic tube having an end over the other cannula end, the outside diameter of said other cannula end being substantially smaller than the normal inside diameter of said flexible tube end, an elastic hub expanded over said cannula and contracting said flexible tube end to said other cannula end, and said elastic hub extending beyond said cannula end and there formed with a tapering bore enlargement which shapes said flexible tube end to extend continuously with said other cannula end and to define a gradual smooth laminar-flow-promoting flare from its contracted to said normal diameter.

2. Flexible tube coupling and closing apparatus comprising a thin flexible elastic tube having an end, a cannula substantially smaller than the tube and having a portion inserted in said end, an elastic hub expanded over the cannula and contracting said flexible tube end about said inserted cannula portion, and a sheath over the projecting cannula portion, said sheath and hub mutually formed to have a sheath-end-enclosing interference fit sealing that sheath end portion which may engage the cannula upon removal of the sheath.

3. A hypodermic needle coupling for the port tubes of medical and surgical fluid handling equipment comprising:
  (a) a plastic fluid collecting and administering tube of flexible resilient composition and thin-walled, integral construction and which is sealable, sterilizable and non-wettable to blood, said thin flexible plastic tube having an end;
  (b) a hypodermic needle comprising a substantially smaller rigid tubular cannula having at one end a point for piercing puncturable closures and for making subcutaneous injections, the other rigid cannula end inserted in said flexible tube end and with the flexible tube end substantially reduced and contracted about the rigid tube end;

said flexible plastic tube and rigid needle cannula forming unmatched tubular parts with the outside diameter of the rigid cannula being substantially smaller than the normal inside diameter of the flexible tube, the cannula-tube relation being exemplified by the coupling of a 15 gauge cannula having an outside diameter of about 0.072 in. to a 3 mm. tube having a full-open inside diameter of about 0.118 in.;

(c) means comprising an extending length of said flexible tube shaped beyond said rigid cannula end for defining a gradual, smooth, laminar-flow-promoting enlargement of the bore of the coupling to the normal full-open diameter of said flexible tube; and (d) means for firmly and directly adhering said substantially reduced and contracted flexible tube end to said rigid cannula end, said adhering means providing sealed interfitting and integral coupling of said substantially smaller rigid cannula directly to said normally substantially larger flexible tube.

4. A hypodermic needle coupling for the port tubes of medical and surgical fluid handling equipment comprising:

(a) a plastic fluid collecting and administering tube of flexible resilient composition and thin-walled integral construction and which is sealable, sterilizable and non-wettable to blood, said thin, flexible plastic tube having an end;

(b) a hypodermic needle comprising a substantially smaller rigid tubular cannula having at one end a point for piercing puncturable closures and for making subcutaneous injections, the other rigid cannula end inserted in said flexible tube end;

said flexible plastic tube and rigid needle cannula forming unmatched tubular parts with the outside diameter of the rigid cannula being substantially smaller than the normal inside diameter of the flexible tube, the cannula-tube relation being exemplified by the coupling of a 15-gauge cannula having an outside diameter of about 0.072 in. to a 3 mm. tube having a full open inside diameter of about 0.118 in.;

(c) an elastic sleeve expanded over said flexible tube end and other cannula end, said elastic sleeve having an inside diameter normally smaller than the outside diameter of said flexible tube end as reduced to engage said other cannula end, whereby said elastic sleeve substantially compresses said flexible tube end contracting it into tight sealing engagement about said other cannula end, and thereby couples said flexible tube directly and integrally to said rigid cannula at its said other end of substantially smaller diameter than said normal inside diameter of said flexible tube end; and (d) means comprising a length of said flexible tube flaring the bore of the coupling substantially beyond said rigid tube end in a gradual smooth laminar flow-promoting enlargement to the normal full open diameter of said flexible tube.

5. A hypodermic needle assembly comprising:
(a) a hub;
(b) a cannula projecting from the hub;
(c) a sheath over the cannula;
(d) means removably coupling the sheath and hub to seal that sheath end portion which may contact the cannula upon removal of sheath, said means comprising radially engaged male and female locking lips on said sheath and hub respectively, said male and female locking lips shaped and proportioned for an interference fit wherein the female lip engages sealingly behind the male lip and to define a sterile field around the sheath open end; and (e) means comprising the male and female locking lips for preventing restoring of said sheath and hub to the tube closing, cannula-and-sheath-end sealing position by manual manipulation applying a merely lateral pushing or closing force, whereby once the sheath has been pulled away from the hub it must remain that way as a visual indication or telltale that the sterility seal has been broken, and qualifying the needle as tamper-proof.

6. A hypodermic needle coupling for the port tubes of medical and surgical fluid handling equipment comprising:

(a) a plastic fluid collecting and administering tube of flexible resilient composition and thin-walled integral construction and which is sealable, sterilizable and non-wettable to blood, said thin flexible plastic tube having an end;

(b) a hypodermic needle comprising a substantially smaller rigid tubular cannula having at one end a point for piercing puncturable closures and for making subcutaneous injections, the other rigid cannula end inserted in said flexible tube end;

said flexible plastic tube and rigid needle cannula forming unmatched tubular parts with the outside diameter of the rigid cannula being substantially smaller than the normal inside diameter of the flexible tube, the cannula-tube relation being exemplified by the coupling of a 15 gauge cannula having an outside diameter of about 0.072 in. to a 3 mm. tube having a full open inside diameter of about 0.118 in.;

(c) an elastic hub expanded over said flexible tube end and other cannula end, said elastic hub having an inside diameter normally smaller than the outside diameter of said flexible tube end as reduced to engage said other cannula end, whereby said elastic hub substantially compresses said flexible tube end contracting it into tight sealing engagement about said other cannula end, and thereby couples said flexible tube directly and integrally to said rigid cannula at its said other end of substantially smaller diameter than said normal inside diameter of said flexible tube end; and (d) rubber sleeve means tightly enclosing said plastic tube beyond said rigid cannula end and defining there a re-sealing site for piercing entry into the plastic tube.

References Cited in the file of this patent

UNITED STATES PATENTS

| | | |
|---|---|---|
| 2,216,686 | Fentress | Oct. 1, 1940 |
| 2,346,334 | Shaw | Apr. 11, 1944 |
| 2,638,897 | Poitras | May 19, 1953 |
| 2,689,562 | Adams et al. | Sept. 21, 1954 |
| 2,704,074 | Butler | Mar. 15, 1955 |
| 2,737,948 | Brown | Mar. 13, 1956 |
| 2,816,550 | Hudson | Dec. 17, 1957 |
| 2,860,635 | Wilburn | Nov. 18, 1958 |
| 2,862,495 | Gewecke | Dec. 2, 1958 |

FOREIGN PATENTS

| | | |
|---|---|---|
| 190,388 | Great Britain | Dec. 21, 1922 |
| 593,470 | Germany | Feb. 28, 1934 |
| 1,130,084 | France | Sept. 17, 1956 |
| 218,169 | Australia | Oct. 23, 1958 |